United States Patent [19]
Duniho

[11] Patent Number: 5,862,309
[45] Date of Patent: *Jan. 19, 1999

[54] HEADER/FOOTER TEXT STRING PARSING USING CALLBACK ROUTINES FOR ADDITIONAL PROCESSING

[75] Inventor: Peter M. Duniho, Redmond, Wash.

[73] Assignee: Microsoft Corporation, Redmond, Wash.

[ * ] Notice: The term of this patent shall not extend beyond the expiration date of Pat. No. 5,835,690.

[21] Appl. No.: 890,607

[22] Filed: Jul. 9, 1997

Related U.S. Application Data

[63] Continuation of Ser. No. 990,892, Dec. 15, 1992, Pat. No. 5,835,690.

[51] Int. Cl.[6] .................................................. G06F 15/00
[52] U.S. Cl. .................................... 395/115; 395/114
[58] Field of Search .................................. 395/115, 114, 395/113, 112, 1.1, 116, 117, 110, 108, 1.9

[56] References Cited

U.S. PATENT DOCUMENTS

| | | | |
|---|---|---|---|
| 4,300,206 | 11/1981 | Belleson et al. | 364/900 |
| 5,001,653 | 3/1991 | Buchanan et al. | 364/523 |
| 5,129,053 | 7/1992 | Makihara | 395/149 |
| 5,146,545 | 9/1992 | Maruyama | 395/115 |
| 5,157,759 | 10/1992 | Bachenko | 395/2 |
| 5,179,649 | 1/1993 | Masuzaki et al. | 395/148 |
| 5,182,709 | 1/1993 | Makus | 364/419 |
| 5,421,001 | 5/1995 | Methe | 395/500 |
| 5,438,659 | 8/1995 | Notess et al. | 395/155 |

OTHER PUBLICATIONS

Simpson, Alan, "Mastering WordPerfect® 5.1 & 5.2 for Windows™," *Sybex Publishing,* San Francisco, Sep. 1992.

*Primary Examiner*—Raymond J. Bayerl
*Assistant Examiner*—Steven P. Sax
*Attorney, Agent, or Firm*—Seed and Berry LLP

[57] ABSTRACT

A spreadsheet program provides a generalized approach to parsing text strings for a header or footer of a page of a spreadsheet document. Parsing is separated from further interpreting of information in the text string, thereby enhancing the expandability of the program and decreasing the amount of code redundancy required to implement more interpreting functionality. A single parser routine may be provided in the spreadsheet program to parse text strings for all of the headers and footers. The parser routine calls a respective callback routine to further process the parsed text string, such as required by printing or editing of the text string. The identity of the callback routine is specified by a high-level routine that called the parser routine.

32 Claims, 10 Drawing Sheets

HEADER/FOOTER TEXT STRING PARSING USING CALLBACK ROUTINES FOR ADDITIONAL PROCESSING

CROSS-REFERENCE TO RELATED APPLICATION

This application is a continuation of U.S. patent application Ser. No. 07/990,892, filed Dec. 15, 1992 now U.S. Pat. No. 5,835,680.

TECHNICAL FIELD

The present invention relates generally to data processing systems and, more particularly, to parsing of text strings holding information about headers or footers in a spreadsheet program.

BACKGROUND OF THE INVENTION

In spreadsheet programs, such as Microsoft Excel, version 3.0, sold by Microsoft Corporation of Redmond, Wash., a user may generate and print a document. Each page of the document includes a header and a footer. The header and the footer provide places for the user to add textual information at the top and bottom of the page, respectively. The header is formed by the topmost lines of a page and holds information such as page number, title of the document, author of the document, date on which the document is printed and/or time at which the document is printed. The footer is similar to the header, but is formed by the lowermost lines of the page. The footer may include page number information and other information, like that found in the header. Both the header and the footer are separate entities from the main body of the page. The header and footer typically are not visible to the user until the document is printed.

Microsoft Excel, version 3.0, stores information about each header and each footer of the document in text strings that are stored as arrays of characters. Separate text strings are stored for the header and the footer of each page of a document. If a user does not specify information to be included in the header or the Looter, a default text string is generated by the spreadsheet program.

Each text string may include two types of information: text and/or commands. Text in the text string includes the characters that are to be printed as part of the header or footer. Commands specify formatting information, alignment information or placeholder information. The commands that specify formatting information are used to format the text that is printed as part of a header or footer. The commands that specify alignment information are used to designate where the text is to be aligned on a page of a document. Lastly, the commands that specify placeholder information are used to add placeholders in a header or footer. The placeholders may be expanded before the header or footer is printed. Thus, for example, a command may specify a page number placeholder for a header. When the header is printed, the appropriate page number is printed as part of the header.

Microsoft Excel, version 3.0, includes a parser routine that parses these text strings. The parser routine parses each text string into text and/or commands. The parser routine includes additional code for further processing the text string, such as required to print headers or footers The code for performing the additional processing is directly integrated into the parser routine.

SUMMARY OF THE INVENTION

It is an object of the present invention to provide an improved method and system for interpreting a text string that holds information regarding a header or a footer of a page of a document.

It is another object of the present invention to provide a method and system using a more generalized approach to interpreting a text string that holds information regarding a header or a footer of a page of a document.

The foregoing and other objects, which will become apparent to those of skill in the art as the invention is described more fully below, are realized by the present invention. In accordance with a first aspect of a preferred embodiment of the present invention, a method is practiced in a data processing system having an output device and running a spreadsheet program. In this method, a text string is provided that includes codes encoding formatting information for a header or a footer of a page to be printed. The header or footer includes textual characters to be printed. The text string is parsed in a parser routine to discriminate and interpret the codes from the textual characters. The parser routine is part of the spreadsheet program. The parser routine calls a callback routine that outputs the textual characters of the header or footer in the interpreted formats on the output device The output device may be, for example, a printer or video display.

The step of providing a text string may further comprise the step of providing a text string having a precursor character followed by a character code that encodes formatting information. An '&' is a suitable precursor character. In addition, the step of interpreting formatting information in the parsed text string may comprise the step of specifying font information about the textual characters or setting alignment of the textual characters on the page. Lastly, the text string may include at least one placeholder. In that case, the method may include the additional step of replacing the placeholder with textual characters.

DETAILED DESCRIPTION OF THE INVENTION

A preferred embodiment of the present invention separates the functionality of parsing a text string for a header or footer from the functionality of performing additional processing on the parsed chunks of the text string. A single parser routine is called by all applications (i.e., high-level routines) to parse the text string, but the parser routine does not perform any additional processing other than parsing the text string. Instead, when additional processing of the text string is needed, the parser routine calls a callback routine that performs the desired processing of the text string. The parser routine may call any one of several callback routines. The high-level routine that calls the parser routine specifies the callback routine to be used. In particular, the high-level routine passes a pointer to a callback routine that is to be called by the parser routine.

The preferred embodiment of the present invention adopts a more generalized approach to parsing and processing of a text string than conventional systems. The approach of the preferred embodiment described herein reduces code redundancy by eliminating the need for duplicating the parser routine each time parsing is needed. In addition, it enhances expandability of the spreadsheet program by allowing additional interpretive functionality to be added easily.

Figure 1:
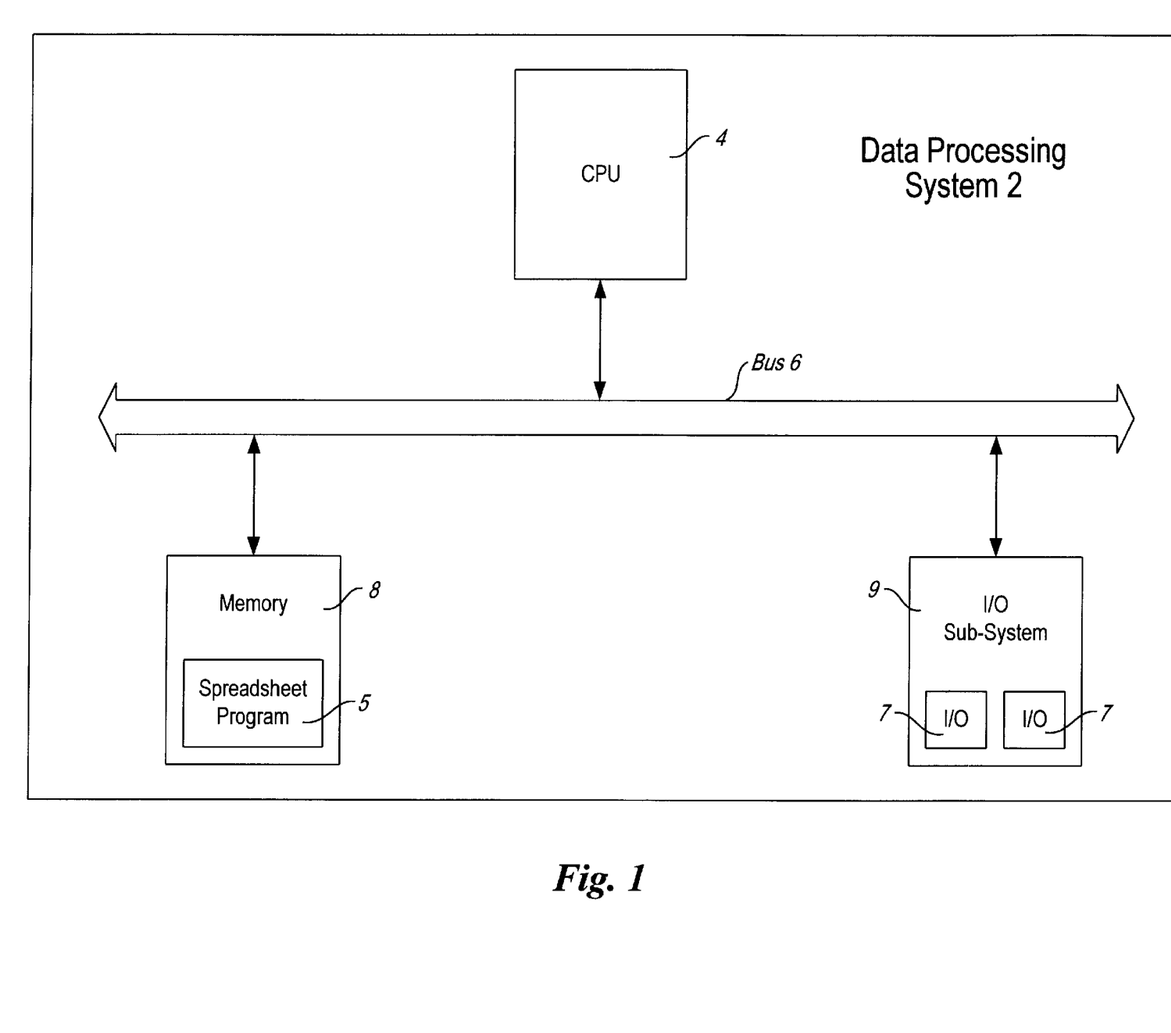
FIG. 1 is a block diagram of a data processing system for practicing a preferred embodiment of the present invention described herein.

The preferred embodiment of the present invention described herein may be implemented on a suitable data processing system, like the data processing system 2 shown in FIG. 1. The data processing system 2 includes a central processing unit (CPU) 4 that communicates with a memory 8 and an input/output (I/O) subsystem 9 through a bus 6. The CPU 4 runs a spreadsheet program 5 held in memory 8. The preferred embodiment described herein utilizes code that is either included in this spreadsheet program 5 or included in a separate module that works in conjunction with the spreadsheet program. The CPU 4 may receive input and generate output through the I/O subsystem 9. The I/O subsystem 9 includes I/O devices 7, such as a printer and video display device.

The preferred embodiment described herein is designed for use as part of or in conjunction with a spreadsheet program, such as Microsoft Excel, version 4.0, sold by Microsoft Corporation of Redmond, Wash. The preferred embodiment described herein is adapted for use with text strings that hold formatting, textual and alignment information for a header or footer of a page of a document, like those described above for Microsoft Excel, version 3.0. For illustrative purposes, the preferred embodiment will be described below with reference to Microsoft Excel, version 4.0.

The preferred embodiment described herein is useful in instances in which the text string for a header or footer is to be interpreted or changed. The interpreting or changing is performed by a callback routine. The spreadsheet program 5 includes a single parser routine for parsing the text string. The parser routine may be called by any of a number of high-level routines executed by the CPU 4. These high-level routines are part of the spreadsheet program 5. Examples of such high-level routines will be described below.

Figure 2:
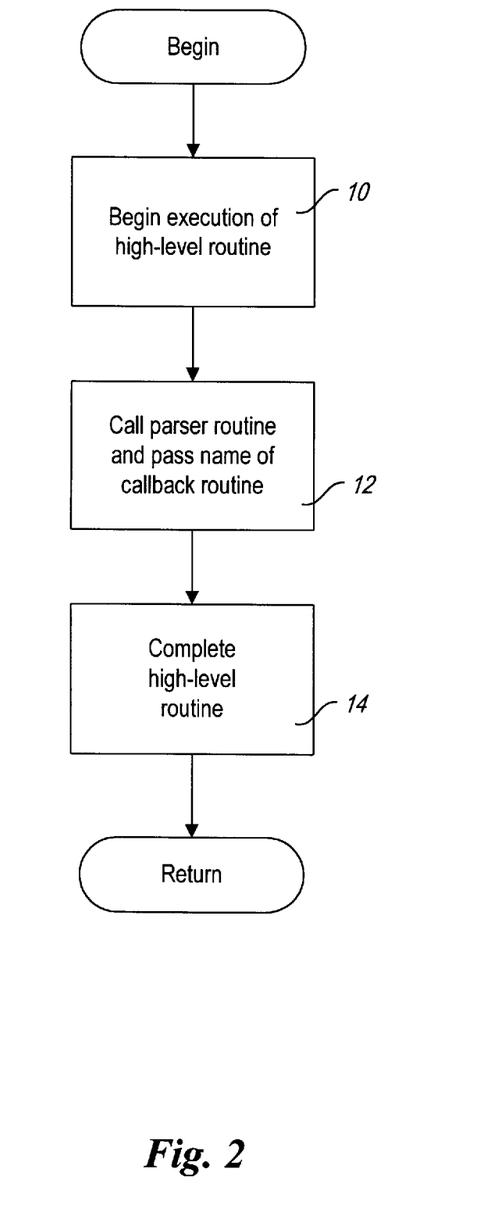
FIG. 2 is a flowchart setting forth a high-level description of the steps performed by the preferred embodiment described herein.

FIG. 2 shows a flowchart depicting an overview of the steps performed by the preferred embodiment described herein in executing a high-level routine that calls the parser routine. The high-level routine begins execution (step 10) and, during the course of execution, calls the parser routine. The high-level routine passes a pointer to a callback routine to the parser routine (step 12). As mentioned above, the callback routine performs further processing of the parsed text string as needed by the high-level routine. The high-level routine also specifies the text string to be parsed by the parser routine. The parser routine then parses the text string and calls the named callback routine during its execution. The parser routine typically calls the callback routine several times during its execution. The callback routine returns to the parser routine when the callback routine is done executing. When the entire text string has been parsed, the parser routine returns to the high-level routine, and the high-level routine completes execution (step 14).

The parser routine appends characters from the text string to a temporary buffer held on a stack for the parser routine. This stack is found in the local memory space of the parser routine in memory 8 (FIG. 1). The appended characters are stored in the temporary buffer as a Pascal-type string. As such, the buffer holds both the byte count for the number of characters in a string and the characters of the string.

As was mentioned above, the parser calls the callback routine. The callback routine is passed a number of parameters by the parser routine. In particular, the callback routine is passed a pointer to a TXP (mnemonic for text properties) data structure that stores font information. The TXP data structure contains the font settings for outputting text. The callback routine is also passed the current alignment variable, a current formatting code, a pointer to a buffer held on the parser routine stack and a pointer to a data structure of the high-level routine.

Before discussing how the parser parses a text string, it is helpful to consider the format of a text string. As mentioned above, the text string is realized as a Pascal-type array of characters. Each "run" of characters (i.e., a meaningful block of adjacent characters in the text string) may hold one of two types of information. First, the run of characters may hold text that is to be output in the header or footer. Second, the run may hold a command. A command may specify formatting information which designates how the textual information is to be formatted when printed. A command may, alternatively, specify alignment information that sets forth the alignment of text on the page in a header or footer. Lastly, a command may hold placeholder information. Placeholders may be expanded, as will be described in more detail below.

Runs holding commands are distinguished from runs holding text, in that the runs holding commands always begin with the character '&'. Following the '&' are special characters that are either formatting characters or placeholder characters. Table I lists the formatting characters that specify formats or alignments. Table II lists the placeholder characters that specify different types of placeholders.

The use of commands may be illustrated by example. Suppose that the text of a footer is to be displayed in boldface. The boldface format of the text is reflected in a command in the text string. Specifically, the text string for the header includes the command '&B' before the text to be printed. '&B' indicates that the text is to be boldfaced. As a further example, suppose a user wants a header to include a page number. The text string of the header, thus, includes a command which sets forth a placeholder for the page number. In particular, the text string for the footer includes the command '&P'.

TABLE I

Formatting Characters

| character | meaning |
|---|---|
| 'B' | Boldface |
| 'I' | Italic |
| 'U' | Underline |
| 'S' | Strikethrough |
| 'L' | Left Alignment |
| 'C' | Center Alignment |
| 'R' | Right Alignment |
| [#] | Font Point Number |

Note: [#] - indicates a numerical value

TABLE II

Placeholder Characters

| Character | Meaning |
|---|---|
| 'P' | Page Number |
| 'N' | Total Number of Pages |
| 'D' | Date |
| 'T' | Time |
| '+' | Increment |
| '−' | Decrement |
| 'F' | Filename |

Figure 3A:
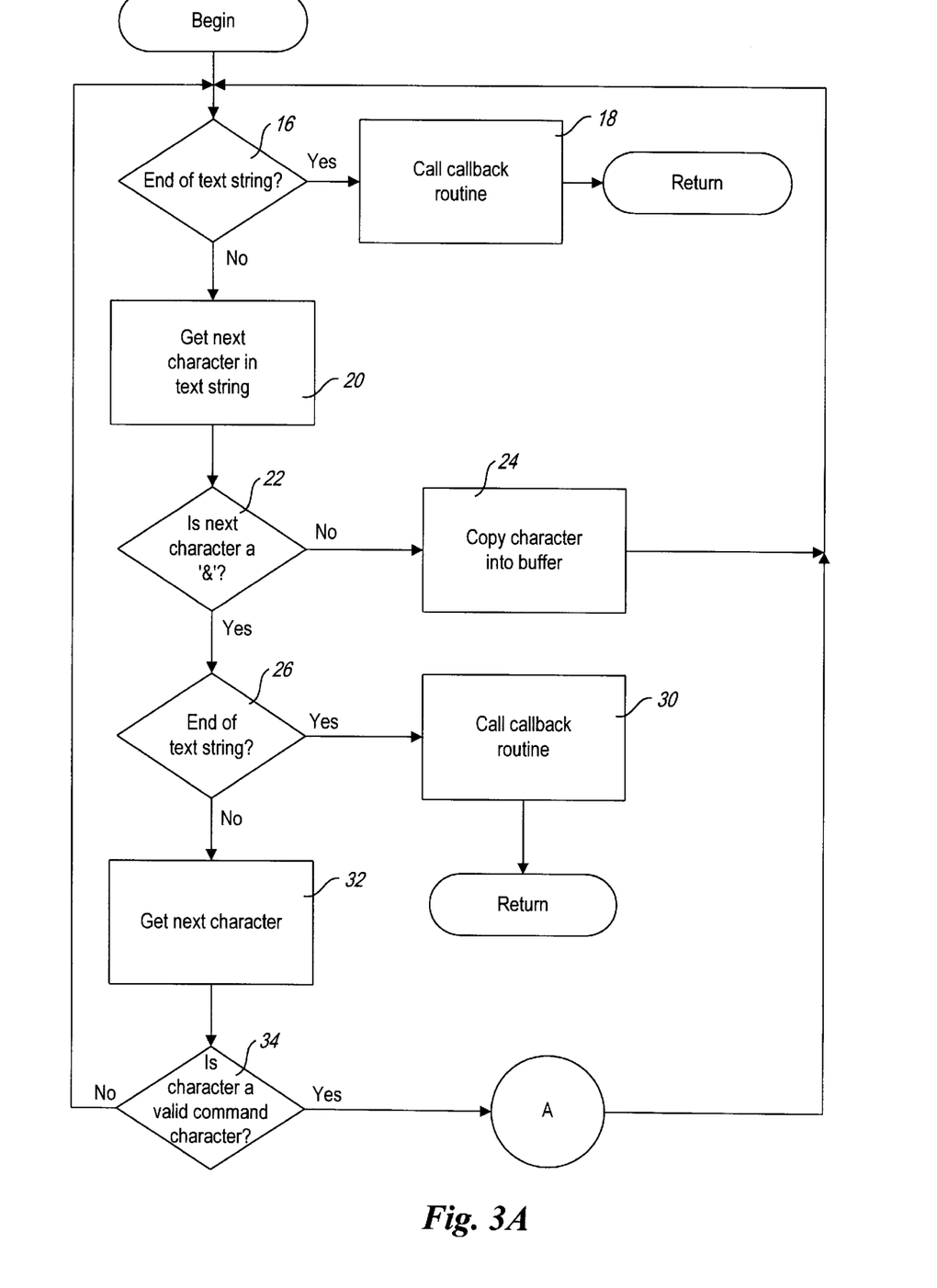
FIG. 3a is a flowchart of the steps performed by the parser routine of the preferred embodiment described herein to iteratively process the characters of a text string.

The parser routine of the preferred embodiment described herein iteratively performs the steps set forth in FIG. 3a. In particular, the parser routine begins at the beginning of the text string and initially checks whether the end of the text string has been reached (step 16). If the end of the text string has not been reached, the parser routine gets the next character in the text string (step 20). The parser routine then checks whether this next character is an '&' (step 22). If the next character is not an '&', the character is not part of a command, but rather the character is text to be printed. Accordingly, the character is copied into the buffer (step 24). Similarly, at step 16, if the end of the text string has been reached, the callback routine is called (step 18).

Figure 3B:
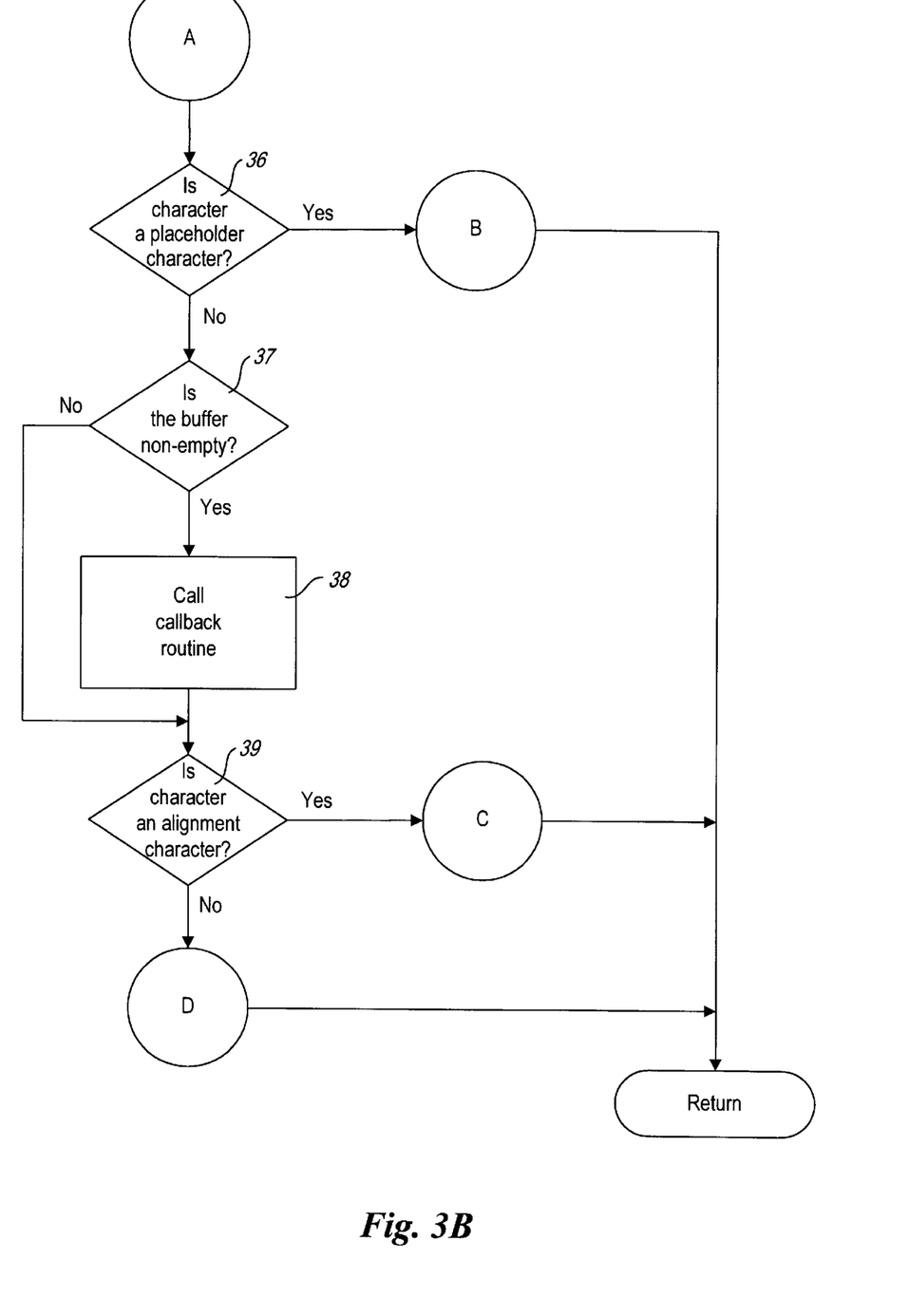
FIG. 3b is a flowchart illustrating the steps performed by the parser routine of FIG. 3a, when a character is a valid command character.

If the next character is an '&' (see step 22), the parser routine assumes that the next character is the beginning of a command. As such, the parser routine checks whether the end of the text string has been reached (step 26). In step 26, if it is determined that the end of the text string has been reached, the callback routine is called (step 30). The role served by the callback routine when called will be described in more detail below. If the end of the text string has not been reached, the character following the '&' is obtained (step 32) and a determination is made whether the character is a valid command character (step 34). A valid command character includes any of the characters listed in Tables I and II (see above). If the character is a valid command character, the steps shown in FIG. 3b are performed (see "A"). In contrast, if the character following the '&' is not a valid command character, both the '&' and the character are ignored.

Figure 4A:
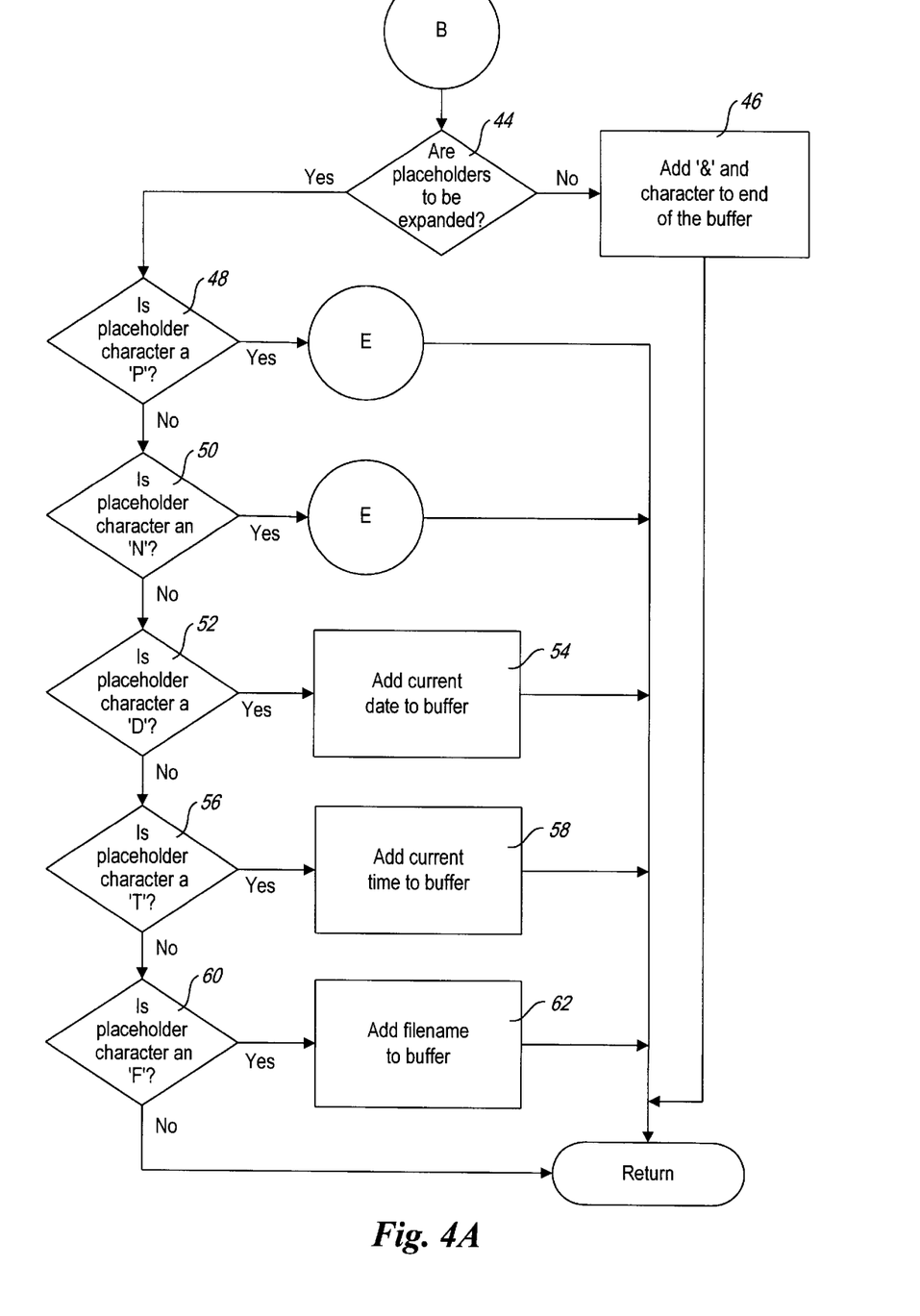
FIG. 4a is a flowchart illustrating the steps performed by the parser routine of the preferred embodiment described herein when a character is a placeholder character.

In FIG. 3b, the parser routine checks whether the character following the '&' is a placeholder character (step 36). A placeholder character is any one of the characters listed in Table II. If the character is a placeholder character, the steps set forth in FIG. 4a are performed (see "B" in FIG. 3b). These steps were described in more detail below.

Figure 5:
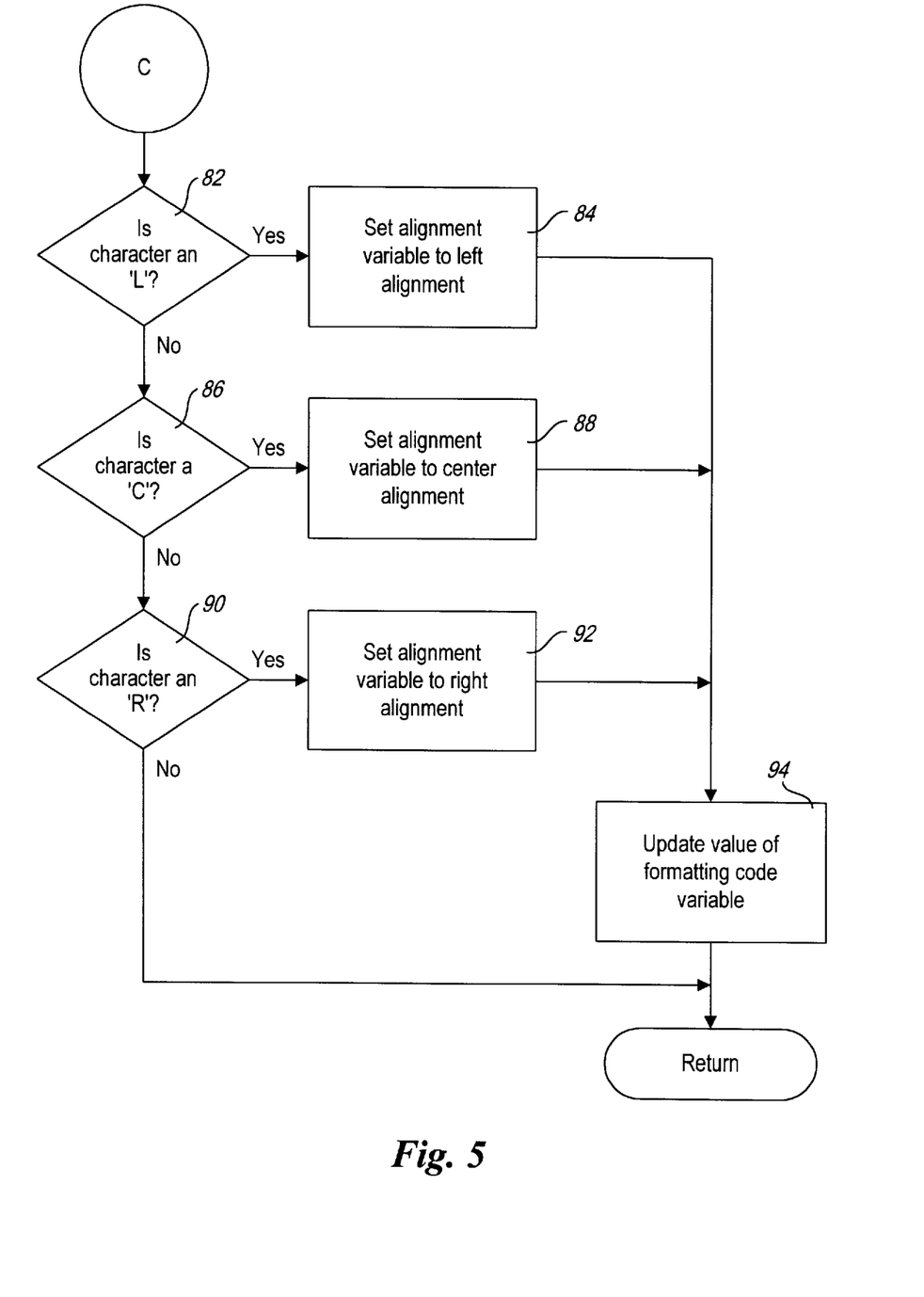
FIG. 5 is a flowchart illustrating the steps performed by the parser routine of the preferred embodiment described herein when a character is deemed to be an alignment character.
Figure 6A:
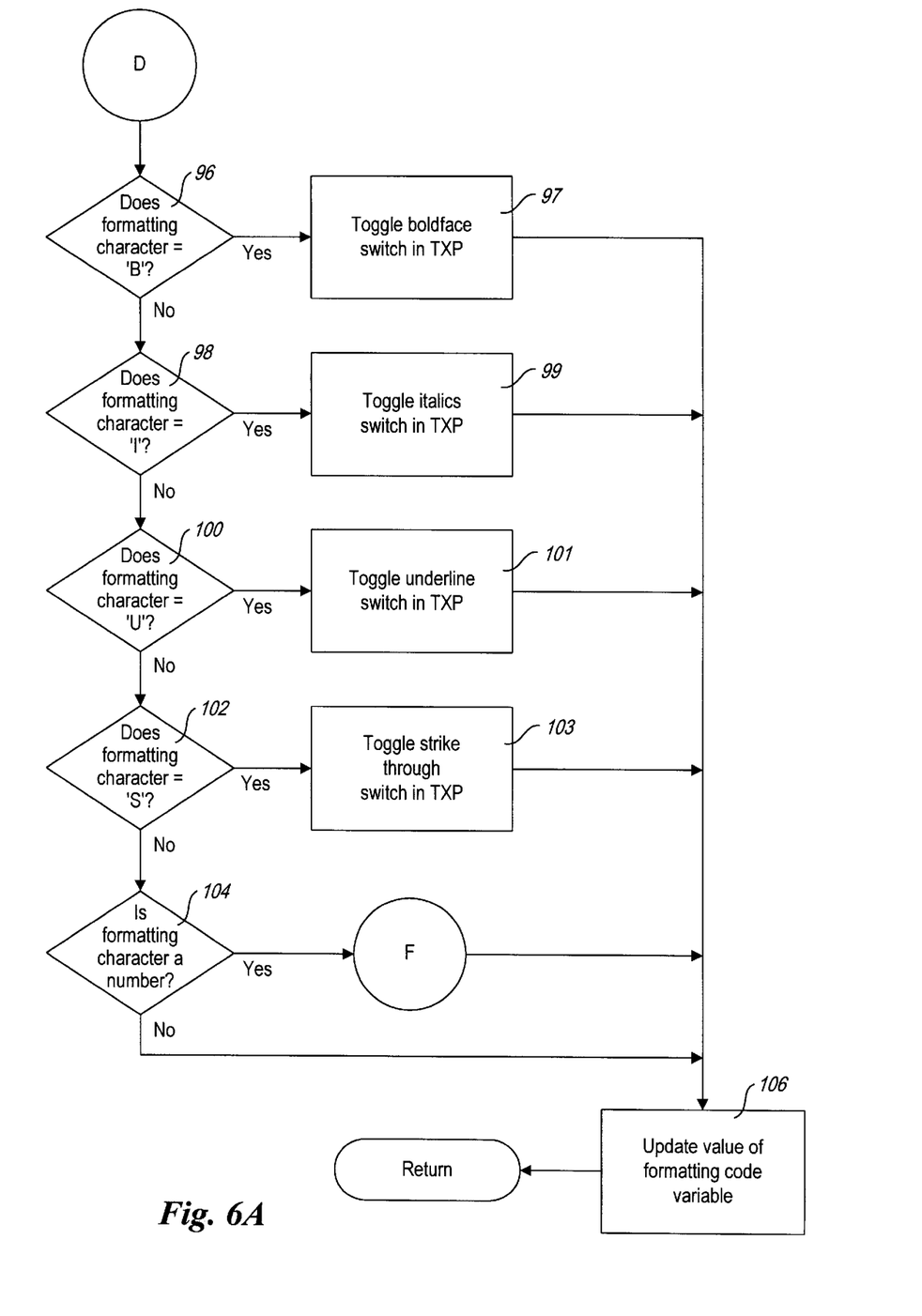
FIG. 6a is a flowchart illustrating the steps performed by the parser routine of the preferred embodiment herein when a character is a formatting character.

If the character following the '&' is not a placeholder character, the parser routine knows that the character is either an alignment character or a command character. Thus, either the alignment or formatting will change once this command is executed. Thus, the parser routine must complete formatting of all characters that are currently in the buffer before the format or alignment changes. Hence, the parser routine checks whether the buffer is non-empty (step 32). If the buffer is nonempty, the callback routine is called (step 38). If the buffer is empty, the callback routine is not called because there is nothing to format. The parser routine then checks whether the character is an alignment character (step 38). Alignment characters are the following characters: 'L', 'C' and 'R'. If the character following the '&' is one of these three alignment characters, the steps shown in FIG. 5 are performed (see "C" in FIG. 3b). These steps will be described in more detail below. If the character following the '&' is neither a placeholder character nor an alignment character, the character must, by default, be a formatting character. As such, the steps shown in FIG. 6a are performed (see "D" in FIG. 2b). These steps will be described in more detail below.

As was mentioned above, if the character following an '&' is a placeholder character, the steps shown in FIG. 4a are performed. First, a determination is made whether the placeholders are to be expanded (step 44). In particular, a boolean parameter is passed to the parser from the high-level routine, that called the parser routine, to specify whether placeholders are to be expanded or not. Based upon the value of this boolean parameter, a determination of whether the placeholders are to be expanded is made When the placeholders are not to be expanded, the '&' character and the character that follows the '&' are added to the end of the buffer (step 46). In contrast, if the placeholders are to be expanded, a number of different steps are performed.

Figure 4B:
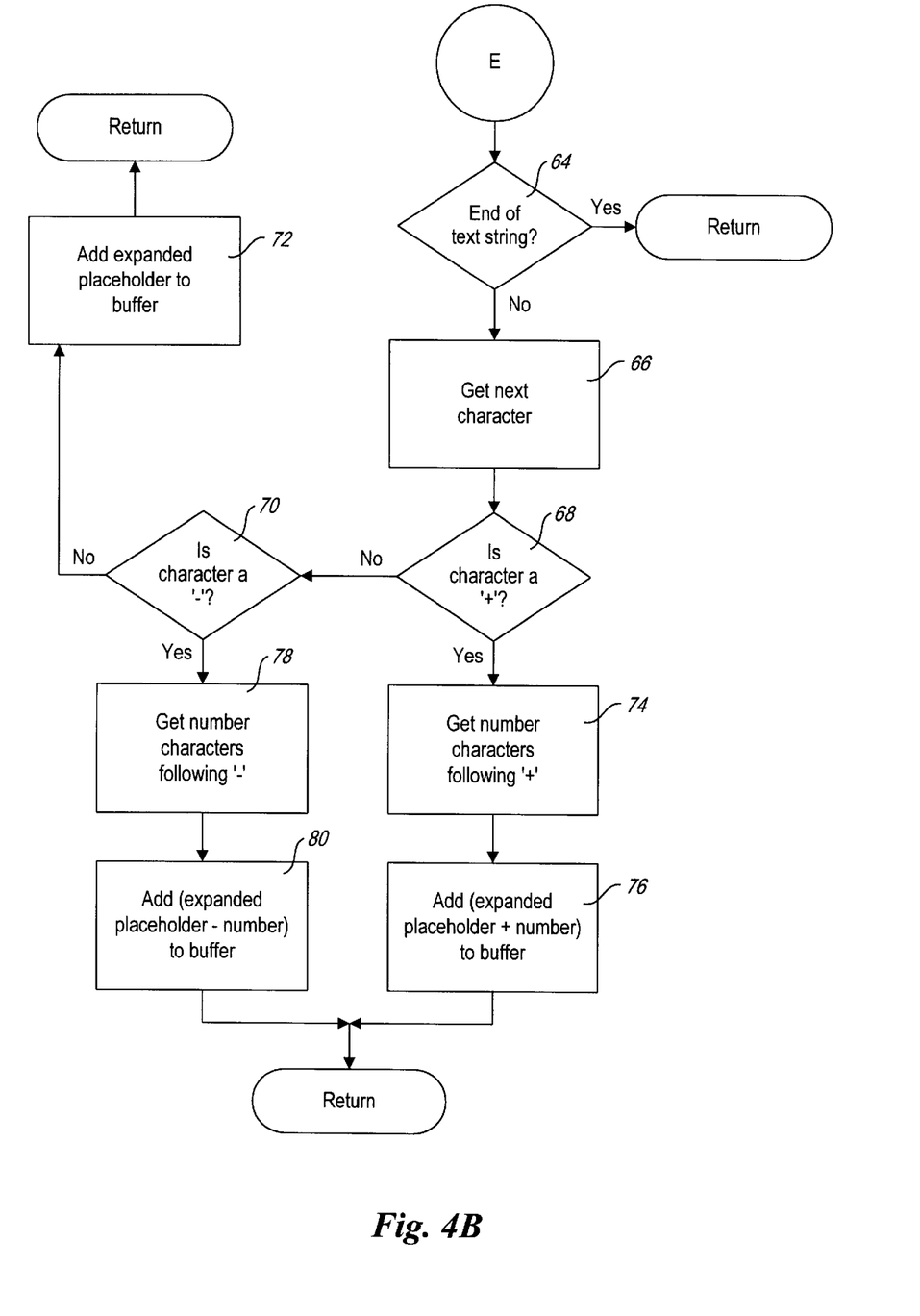
FIG. 4b is a flowchart illustrating the steps performed by the parser routine of the preferred embodiment described herein when a character is a 'P' or an 'N' placeholder character.

When the placeholders are to be expanded, the character following the '&' (hereinafter referred to as the "placeholder character") is examined to determine whether it is a 'P' (step 48). If the placeholder character is a 'P', the steps shown in FIG. 4b are performed (see "E" in FIG. 4a). If this test is not fulfilled, the parser routine checks whether the placeholder character is an 'N', (step 50). If the placeholder character is an 'N', then the steps shown in FIG. 4b are executed. The 'P' character is the placeholder character for page number, and the 'N' character is the placeholder character for total number of pages. Both of these placeholder characters may be followed by the additional placeholder characters of '−' or '+'. The '+' and '−' characters, in turn, are followed by numerical values. The numerical values specify the amount that the page number or the total number of pages is to be incremented or decremented (depending on whether the number follows a '−' or a '+'). As such, the steps shown in FIG. 4b are executed. These steps will be described below.

In step 52 of FIG. 4a, the parser routine checks whether the placeholder character is a 'D'. From Table II, it can be seen that the placeholder character 'D' is a placeholder for the current date. If the placeholder character is a 'D', characters specifying the current date are added to the buffer (step 54). For instance, if the current date was October 10, the character string "October 10" would be added to the end of the buffer.

In step 56, the parser routine checks whether the placeholder character is a 'T', which is a placeholder character for the current time. Hence, when the placeholder character is a 'T', characters specifying the current time are added to the buffer (step 58).

Lastly, in step 60, the parser routine checks whether the placeholder character is an 'F' (step 60). This is the placeholder character for the file name of the document. When the placeholder character is an 'F', the file name is added to the end of the buffer (step 62).

As mentioned above, if the placeholder character is either a 'P' or an 'N' (see steps 48 and 50), the steps shown in the flowchart of FIG. 4b are executed. In FIG. 4b, the parser routine first checks whether the end of the text string has been reached (step 64). If the end of the text string has been reached, this section of code returns. However, if the end of the text string has not been reached, the next character is obtained (step 66). The parser routine checks whether the next character is a '+' (step 68). If the next character is not a '+', the parser routine checks whether the next character is a '−' (step 70). If the next character is neither a '+' nor a '−', the placeholder value is not to be decremented or incremented. The placeholder is expanded and added to the end of the buffer (step 72).

When the character following the placeholder character is a '+' (see step 68), the parser routine gathers the number characters that follow the '+' in the text string (step 74). The value of the expanded placeholder is then incremented by a value specified by the gathered numbers. The corresponding character value for the calculated number is added to the buffer (step 76).

If the character following the placeholder character is a '−' (step 70), the parser routine gathers the numbers following the '−' in the text string (step 78). The expanded placeholder value is then decremented by the gathered numerical value. The resulting calculated value is converted into characters and added to the end of the buffer (step 80).

When the character following '&' is an alignment character, the steps shown in the flowchart of FIG. 5 are executed. In step 82, the parser routine checks whether the character is an 'L'. If the character is an 'L', the alignment variable is set to a left alignment (step 84). If the character is not an 'L', the parser routine checks whether the character is a 'C' (step 86). If the character is a 'C', the alignment variable is set to a center alignment (step 88). If the character is neither an 'L' or a 'C', the parser routine checks whether the character is an 'R' (step 90). When the character is an 'R', the alignment variable is set to a right alignment (see step 92). In each of these instances, the value of the formatting-code variable is updated (step 94). The code shown in FIG. 5 then returns.

FIG. 6a is a flowchart depicting the steps performed when the character following a '&' is a formatting character. In step 96, the parser routine checks whether the formatting character equals a 'B'. A value of 'B' is a signal to the parser routine to toggle the boldface switch in TXP (step 97). The TXP data structure includes a number of switches that may be toggled between different values. Each time a formatting command is received for a particular switch, the switch is toggled to its opposite value. Hence, the boldface switch is toggled when a 'B' character follows a '&' character.

In step 98, the parser routine checks whether the character following the '&' is an 'I'. The 'I' character specifies that the italics switch in TXP is to be toggled. Accordingly, the parser routine toggles the italics switch (step 99).

In step 100, the parser routine checks whether the formatting character is a 'U'. If the formatting character is a 'U', the underlining switch is toggled in TXP (step 101). In step 102, the parser routine checks whether the formatting character is an 'S'. If the formatting character is an 'S', the strikethrough switch in TXP is toggled (step 103).

Figure 6B:
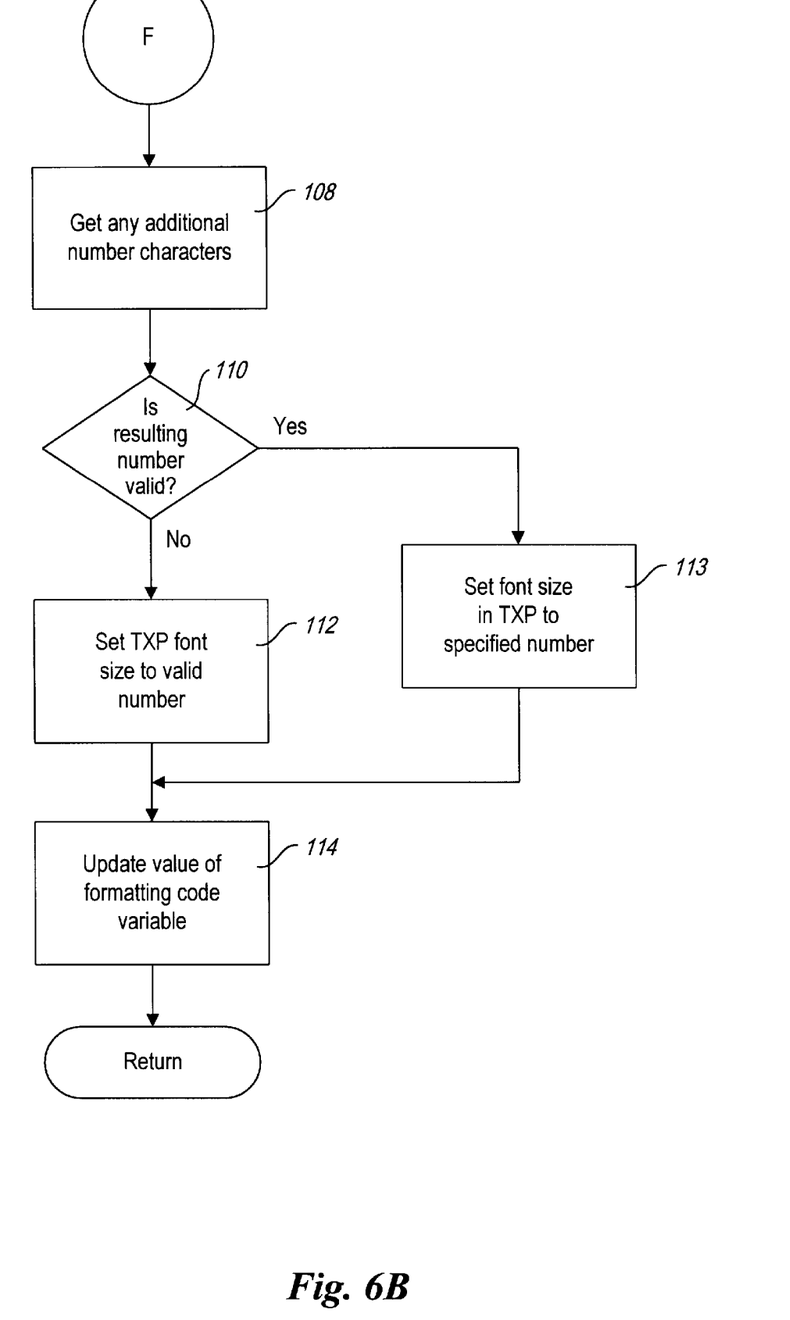
FIG. 6b is a flowchart illustrating the steps performed by the parser routine of the preferred embodiment described herein when numerical formatting characters follow a '&'.

Lastly, the parser routine checks whether the formatting character is a number (step 104). If the formatting character is a number, the steps shown in the flowchart of FIG. 6b are performed (see "F" in FIG. 6a). These steps will be described in more detail below.

When a proper formatting character has been received and the appropriate switches have been toggled or the appropriate steps have been performed to manipulate TXP, the value of the formatting-code variable is updated to reflect the recently received formatting character (step 106).

If the character following a '&' is a number, the run of characters being processed is a command requesting a change in the font size. The steps shown in FIG. 6b are executed in such an instance. First, the parser routine gathers any additional number characters that follow the initial number character (step 108). The point size specified by these numbers may, in many instances, be more than one digit in length. As such, additional number characters may follow the first number character. The parser routine then checks whether the resulting number specified by the number characters is a valid font size (step 110). If the resulting number is not a valid font size, the font size is set in TXP to have a valid number (step 112). Zero, as well as all positive numbers less than a predetermined maximum, are valid font sizes. If the font size is too large, the font size is set at the predetermined maximum. The font size cannot be too small, since the font size can never be specified as a negative number.

If the resulting number is valid, as checked in step 110, the font size in TXP is set to have a value equal to the specified valid number (step 113). The value of the formatting-code variable is also updated to equal the valid number that is set in either step 112 or step 113 (step 114).

As described above, the parser routine calls a callback routine at different points during its execution. The nature of the function performed by the callback routine depends on the high-level routine that calls the parser routine. One high-level routine that calls the parser routine in Microsoft Excel, version 4.0, is the routine responsible for editing the text strings of headers and footers. Microsoft Excel, version 4.0, provides a routine that generates a dialog box 116, like that shown in FIG. 7, to allow a user to edit the text string for a header or footer. For user convenience, the dialog box 116 includes placeholder buttons 120a, 120b, 120c, 120d and 120e. By pushing any of these buttons (i.e., by placing a mouse cursor over the button and clicking), a user is able to add placeholders to the text string. Button 120a adds a placeholder to a footer or a header so that the page number is printed in the header. Button 120b adds a placeholder to the header or footer so that the total number of pages is printed in the header or footer. Button 120c adds a date placeholder to the header or footer so that the header or footer includes the current date. Button 120a adds a time placeholder to the header or footer so that the header or footer includes the time of printing. Lastly, button 120e adds a file name placeholder to the header or footer so that the file name is included in the header or footer.

Figure 7:
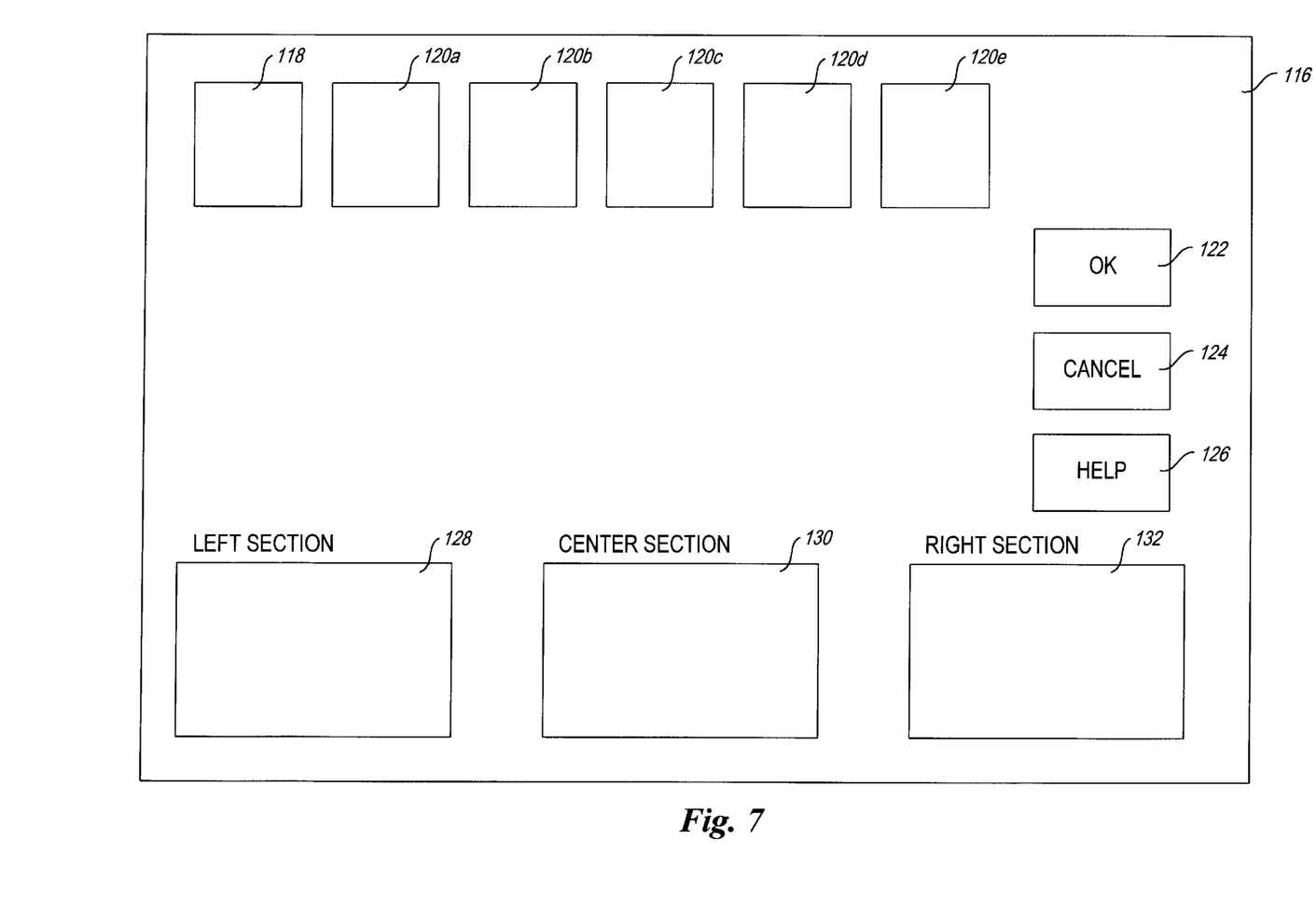
FIG. 7 is a block diagram illustrating a dialog box used in editing text strings of a header/footer in the preferred embodiment described herein.

In addition, a font button 118 is provided in the dialog box 116 for a user to edit formatting information held in TXP for the text string. Hitting the font button 118 causes a menu of formatting choices to be displayed. The user may specify the size of the font (e.g., 10-point, 12-point, 14-point, etc.), the style of font (e.g., bold, italic, etc.), underlining of characters and striking through of characters.

The dialog box 116 also includes edit item boxes 128, 130 and 132. These edit item boxes 128, 130 and 132 hold the text and placeholder information for the left alignment, center alignment and right alignment of the header or footer on a page. A user selects one of the edit items to be the active edit item that is currently being edited. Depressing one of the placeholder buttons 120a, 120b, 120c, 120d and 120e causes a run of characters encoding the placeholder to be added to the text string in the active edit item box.

When a user is done editing the edited text string, he presses the "OK" button 122 to save his changes. If the user does not wish to save the changes to the text string, the user presses the "CANCEL" button 124. The user may also press the "HELP" button 126 to obtain helpful information from the system on how to use the dialog box 116.

As can be seen from the above discussion, the user may edit the text string of a header or footer through the dialog box 116 by manipulating placeholders and/or formatting information. The user may also directly edit the text included in the edit item boxes 128, 130 and 132 by positioning the cursor in the boxes and using the keyboard to change the contents of the boxes. The information displayed in the edit item boxes does not correspond exactly with the characters that are included in the text strings. In particular, formatting characters in the text string are omitted from the edit item boxes 128, 130 and 132. Only placeholders and text are shown in the edit item boxes. The conversion of the text string into a format appropriate for display in the edit item boxes is performed by a callback routine. The high-level routine maintains a data structure for each edit item. The callback routine fills and/or changes the data structure to bring about the desired editing.

An illustration is helpful to explain operation of the parser routine and the callback routine that edits text strings. Suppose that a text string of '&L&B&PMy Sheet&CDocument' is held for a header of a page of a document. When this text string is to be displayed on a dialog box 116, like that shown in FIG. 7 for editing, the parser routine is first called. The parser routine begins with the first character in the text string. As shown in FIG. 3a, the parser routine checks whether the end of the text string has been reached (step 16) and gets the first character (step 20) (i.e., '&'). In step 22, it is determined that this character is an '&'; thus, the next character, 'L', is obtained. A determination is made in step 34 that the character of 'L' is a valid command character. Accordingly, the steps shown in the flowchart of FIG. 3b are performed.

At step 36 of FIG. 3b, it is determined that the character 'L' is not a placeholder character. Thus, in step 37, the parser routine checks whether the buffer is non-empty. In this instance, the buffer is empty and, hence, the parser routine checks whether 'L' is an alignment character (step 39). The steps shown in the flowchart of FIG. 5 are then performed since 'L' is an alignment character. Specifically, in step 82, it is determined that the character is an 'L'; thus, the alignment variable is set to a left alignment (step 84). The value of the formatting-code variable is updated to an 'L' (step 94).

The parser then returns to step 16 of FIG. 3a. The characters '&B&PMy Sheet&CDocument' remain to be processed in the text string. The parser routine proceeds to get the next character in the text string (see step 20) and determines that the next character is a '&' (see step 22). As such, the next character is obtained in step 32. In this instance, the next character is a 'B'. The character of 'B' is a valid command character (see step 34). Thus, the steps shown in FIG. 3b are executed.

It is determined that 'B' is a formatting-code character, such that the steps shown in the flowchart of FIG. 6a are executed. In step 96, it is determined that the formatting character equals 'B'. The boldface switch in TXP is then toggled (see step 97). The value of the formatting-code variable is updated to 'B' (see step 106).

The parser routine returns to step 16 of FIG. 3a. The characters '&PMy Sheet&CDocument' remain to be processed in the text string. The next character is obtained in step 20, and the next character is determined to be a '&' in step 22. The character following the '&' is obtained in step 32. This character is a 'P'. This character is a valid command character as checked in step 34. Accordingly, the steps set forth in FIG. 3b are executed.

In step 36 of FIG. 3b, it is determined that 'P' is a placeholder character. Accordingly, the steps shown in FIG. 4a are executed. In this instance, the placeholders are not to be expanded (see step 44). The high-level routine does not wish to expand the placeholders. The characters '&P' are added to the end of the buffer (see step 46). Next, the parser routine returns to step 16 of FIG. 3a and gets the next character in the text string. At this point, the characters 'My Sheet&CDocument' remain to be processed. In the present example, the next character is an 'M'. In step 22, it is determined that this character is not an '&'. Thus, the character is copied into the buffer in step 24. All of the characters in the textual phrase 'My Sheet' are processed in an analogous fashion, so that they are copied into the buffer.

Once all of these characters are copied into the buffer, the next character, '&', is obtained in step 20 of FIG. 3a. Only the characters '&CDocument' remain to be processed. In step 22, it is determined that the next character is an '&', and the character 'C' that follows the '&' is obtained. 'C' is determined to be a valid command character. Before the command '&C' can be processed, step 37 is executed in FIG. 3b. In step 37, it is determined that the buffer is non-empty and the callback routine is called (step 38). The callback routine displays the text held in the buffer in the proper edit item box using the specified format. In the present example, '&PMy Sheet' is displayed in boldface in the left edit item box 128 (FIG. 7). The callback routine also clears the buffer.

When the callback routine returns, the run '&C' is processed as a alignment command in a fashion analogous to that described above for '&L' (see the flowchart of FIG. 5). Specifically, the alignment variable is set to have a value equal to the center alignment, and the command variable is filled with a value of '&C'. Furthermore, the text characters 'Document' that remains in the unprocessed text string are added into the buffer, and when the end of the text string is reached, this text is output in the center edit item 130 (FIG. 7) by the callback routine.

Another high-level routine that calls the parser routine is a routine that is responsible for printing text. The parser routine behaves as previously described, except that placeholders are expanded. Furthermore, the callback routine that is invoked is different from the above-described callback routine for editing the text string. The printing callback routine performs many of the same steps that are performed for the editing callback routine. The printing callback routine differs in that instead of outputting the buffer contents to edit item boxes, it prints the buffer contents on a page with appropriate alignment and formatting. Thus, this callback routine interprets both alignment commands and formatting commands.

There may be many other high-level routines that call the parser routine and require different callback routines. For instance, a high-level routine used to establish compatibility with other products may employ a callback routine that ignores the formatting and alignment information and merely extracts the textual information from the text string. Similarly, a high-level routine that converts the formatting information of the text string into another format may call the parser. The callback routine is responsible for converting the parsed text string into a new format.

While the present invention has been described with reference to a preferred embodiment thereof, those skilled in the art will appreciate that various changes in form and scope may be made without departing from the spirit of the present invention as defined in the appended claims.

I claim:

1. A method in a computer system for outputting a text string for a header or footer or main body of a document, the method comprising:

under control of a high-level routine, invoking a parser routine passing an indication of the text string and an indication of an output callback routine, the text string having characters and formatting codes;

under control of the invoked parser routine, processing the text string to identify the characters and the formatting codes;

when a formatting code is identified, invoking the indicated output callback routine passing characters identified since the last formatting code was identified; and when the processing of the text string is complete, invoking the indicated output callback routine passing characters identified since the last formatting code was identified; and returning to the high-level routine; and under control of the invoked output callback routine, outputting the passed characters in accordance with a previously identified formatting code; and returning to the parser routine.

2. The method of claim 1 wherein a plurality of high-level routines invoke the parser routine passing different output callback routines.

3. The method of claim 1 wherein the high-level routine is a print routine of a spreadsheet program.

4. The method of claim 1 wherein the high-level routine is a display routine of a spreadsheet program.

5. The method of claim 1 wherein the text string describes a footer or a header to be output.

6. The method of claim 1 wherein the formatting codes include alignment codes.

7. A method in a computer system for outputting a string for a header or footer or main body of a document, the method comprising:

under control of an invoking routine, invoking a parser routine passing an indication of the string and an indication of a callback routine, the string having output data and output codes;

under control of the invoked parser routine, processing the string to identify the output data and the output codes;

when an output code is identified, invoking the indicated callback routine passing output data; and when the processing of the string is complete, returning to the invoking routine; and under control of the invoked callback routine, outputting the passed output data in accordance with an identified output code and returning to the parser routine.

8. The method of claim 7 wherein the output codes include formatting codes.

9. The method of claim 7 wherein the output codes include alignment codes.

10. The method of claim 7 wherein when the processing of the string is complete, invoking the indicated callback routine passing output data prior to returning to the invoking routine.

11. The method of claim 7 wherein the output data passed to the indicated callback routine is that output data identified since the indicated callback routine was last invoked.

12. The method of claim 7 wherein the output data passed to the indicated callback routine is the output data identified since the last output code was identified.

13. The method of claim 7 wherein a plurality of invoking routines invoke the parser routine passing different callback routines.

14. The method of claim 7 wherein the invoking routine is a print routine of a spreadsheet program.

15. The method of claim 7 wherein the invoking routine is a display routine of a spreadsheet program.

16. The method of claim 7 wherein the string describes a footer or a header to be output.

17. The method of claim 7 wherein the output data is characters.

18. The method of claim 7 wherein the string is a text string.

19. A computer-readable medium containing instructions for causing a computer system to output a text string for a header or footer or main body of a document, by:

under control of an invoking routine, invoking a parser routine passing an indication of the text string and an indication of a callback routine, the text string having characters and format codes;

under control of the invoked parser routine, identifying the characters and the format codes within the passed text string;

when a format code is identified, invoking the indicated callback routine passing characters identified since the indicated callback routine was last invoked; and when the processing of the text string is complete, returning to the invoking routine; and under control of the invoked callback routine, outputting the passed characters in accordance with an identified format code and returning to the parser routine.

20. The computer-readable medium of claim 19 wherein the format codes include alignment codes.

21. The computer-readable medium of claim 19 wherein when the processing of the text string is complete, invoking the indicated callback routine passing characters.

22. The computer-readable medium of claim 19 wherein the passed characters are those characters identified since the indicated callback routine was last invoked.

23. The computer-readable medium of claim 19 wherein the passed characters are those characters identified since the last format code was identified.

24. The computer-readable medium of claim 19 wherein a plurality of invoking routines invoke the parser routine passing different callback routines.

25. The computer-readable medium of claim 19 wherein the invoking routine is a print routine of a spreadsheet program.

26. The computer-readable medium of claim 19 wherein the invoking routine is a display routine of a spreadsheet program.

27. The computer-readable medium of claim 19 wherein the text string describes a footer or a header to be output.

28. A computer system for outputting text strings for a header or footer or main body of a document, comprising:

a plurality of output callback routines for receiving characters and outputting the received characters;

a parser routine for receiving an indication of a text string and an indication of one of the plurality of output callback routines, for processing the text string to identify characters and formatting codes, and when a formatting code is identified, invoking the indicated output callback routine passing characters identified since the last formatting code was identified; and a plurality of high-level routines for invoking the parser routine passing an indication of a text string and an indication of one of the plurality of output callback routines to effect the output of the indicated text string.

29. The computer system of claim 28 wherein the high-level routine is a print routine of a spreadsheet program.

30. The computer system of claim 28 wherein the high-level routine is a display routine of a spreadsheet program.

31. The computer system of claim 28 wherein the text strings describes a footer or a header to be output.

32. The computer system of claim 28 wherein the formatting codes include alignment codes.

\* \* \* \* \*